United States Patent
Takahara (10) Patent No.: US 9,967,450 B2
(45) Date of Patent: May 8, 2018

(54) FOCUS ADJUSTMENT DEVICE AND IMAGING APPARATUS

(71) Applicant: NIKON CORPORATION, Tokyo (JP)

(72) Inventor: Hiroaki Takahara, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 95 days.

(21) Appl. No.: 14/161,511

(22) Filed: Jan. 22, 2014

(65) Prior Publication Data

US 2014/0204231 A1 Jul. 24, 2014

Related U.S. Application Data (63) Continuation of application No. PCT/JP2012/067847, filed on Jul. 12, 2012.
(Continued)

(30) Foreign Application Priority Data

Jul. 22, 2011 (JP) .................................. 2011-160731

(51) Int. Cl.
 H04N 5/232 (2006.01)
 G02B 7/34 (2006.01)
 H04N 5/369 (2011.01)
 G03B 13/36 (2006.01)

(52) U.S. Cl.
 CPC .......... *H04N 5/23212* (2013.01); *G02B 7/34* (2013.01); *G03B 13/36* (2013.01); *H04N 5/23245* (2013.01); *H04N 5/3696* (2013.01)

(58) Field of Classification Search
 None
 See application file for complete search history.

(56) References Cited

U.S. PATENT DOCUMENTS

| 8,503,872 B2 * | 8/2013 | Won | G02B 7/102 348/345 |
|---|---|---|---|
| 2004/0109067 A1 | 6/2004 | Yokoi | |

(Continued)

FOREIGN PATENT DOCUMENTS

| CN | 1692631 A | 11/2005 |
|---|---|---|
| CN | 100458553 C | 2/2009 |

(Continued)

OTHER PUBLICATIONS

Apr. 28, 2015 Office Action issued in Japanese Patent Application No. 2011-160731.
(Continued)

*Primary Examiner* — Roberto Velez
*Assistant Examiner* — Yih-Sien Kao
(74) *Attorney, Agent, or Firm* — Oliff PLC (57) ABSTRACT

A focus adjustment device comprising an imaging unit that outputs image signals corresponding to images by an optical system; a focus detection unit that performs focus detection processes to detect focal states of the optical system; an aperture that restricts light beams to the imaging unit; an aperture drive unit; an initiation unit that initiates the focus detection process by the focus detection unit; a focused state determination unit that determines repeatedly whether the focal state of the optical system is a focused state or not based on a focus detection result when the initiation of the focus detection process is being performed; a mode set unit that sets motion picture imaging modes; and a control unit that controls the focused state determination when aperture is being driven, wherein the control unit allows the focused determination process when the aperture is driven if motion picture imaging mode is set.

17 Claims, 9 Drawing Sheets

Related U.S. Application Data (60) Provisional application No. 61/604,240, filed on Feb. 28, 2012.

(56) References Cited

U.S. PATENT DOCUMENTS

| | | |
|---|---|---|
| 2004/0155976 A1 | 8/2004 | Suda |
| 2004/0189856 A1* | 9/2004 | Tanaka ............... H04N 5/23293 348/345 |
| 2008/0112689 A1 | 5/2008 | Yokoi |
| 2008/0316353 A1 | 12/2008 | Suda |
| 2009/0278966 A1* | 11/2009 | Kusaka .................... G02B 7/36 348/294 |
| 2010/0194931 A1 | 8/2010 | Kawaguchi et al. |
| 2011/0090393 A1* | 4/2011 | Kawarada .......... H04N 5/23209 348/345 |

FOREIGN PATENT DOCUMENTS

| | | |
|---|---|---|
| CN | 101772952 A | 7/2010 |
| CN | 102045510 A | 5/2011 |
| JP | A-2005-295577 | 10/2005 |
| JP | 2007189312 A * | 7/2007 |
| JP | A-2007-189312 | 7/2007 |
| JP | A-2011-085871 | 4/2011 |
| JP | 2011-112731 A | 6/2011 |

OTHER PUBLICATIONS

International Search Report issued in International Application No. PCT/JP2012/067847 dated Oct. 16, 2012.
Jul. 20, 2015 Office Action issued in Chinese Application No. 201280045792.3.

* cited by examiner

FOCUS ADJUSTMENT DEVICE AND IMAGING APPARATUS

BACKGROUND OF THE INVENTION

1. Field of the Invention

The present invention relates to a focus adjustment device and an imaging apparatus.

2. Description of the Related Art

A technique is heretofore known in which a plurality of pixels for focus detection are provided in an imaging device and the output of the pixels is used as the basis to detect the deviation amount of an image plane by an optical system thereby to detect the focal state of the optical system (e.g., JP2007-189312A).

SUMMARY OF THE INVENTION

According to the prior art, however, while the aperture is being driven, the focal state of the optical system is changed in accordance with the change in the aperture size. Therefore, in order to appropriately perform a focused state determination, it may be necessary to prohibit the focused state determination during the drive of the aperture and to perform the focused state determination after the drive of the aperture is completed. This may require a long time before the focused state determination is completed.

Objects of the present invention include providing a focus adjustment device which can appropriately perform the focus adjustment of an optical system.

The present invention provides the following means to achieve the above objects.

According to an aspect of the present invention, there is provided a focus adjustment device comprising: an imaging unit that captures an image by an optical system to output an image signal corresponding to the captured image; a focus detection unit that uses the image signal output from the imaging unit as the basis to perform a focus detection process that detects repeatedly a focal state of the optical system; an aperture that restricts light beams passing through the optical system and being incident to the imaging unit; an aperture drive unit that drives the aperture; an initiation unit that initiates the focus detection process by the focus detection unit; a focused state determination unit that performs a focused state determination process to determine repeatedly whether the focal state of the optical system is a focused state or not on the basis of a focus detection result by the focus detection unit when the initiation of the focus detection process is being performed by the initiation unit; a mode set unit that is capable of setting a motion picture imaging mode; and a control unit that controls the focused state determination process by the focused state determination unit when the aperture is being driven by the aperture drive unit, wherein the control unit allows the focused determination process even when the aperture is being driven by the aperture drive unit if the motion picture imaging mode is set.

The above focus adjustment device according to the present invention may be configured such that the mode set unit is further capable of setting a still picture imaging mode in addition to the motion picture imaging mode, and the control unit prohibits the focused state determination process when the aperture is being driven by the aperture drive unit if the still picture imaging mode is set.

The above focus adjustment device according to the present invention may be configured such that the focus detection unit detects repeatedly a deviation amount of an image plane by the optical system using a phase difference thereby to be capable of focus detection by a phase difference detection system that detects the focal state of the optical system.

The above focus adjustment device according to the present invention may be configured such that the focus detection unit repeatedly detects, on the basis of an output from focus detection pixels provided at a light receiving plane of the imaging unit, a deviation amount of an image plane by the optical system using a phase difference thereby to be capable of focus detection by a phase difference detection system that detects the focal state of the optical system.

According to another aspect of the present invention, there is provided an imaging apparatus comprising the above focus adjustment device.

According to the present invention, focus adjustment of the optical system can be appropriately performed.

BRIEF DESCRIPTION OF THE DRAWINGS

FIG. 5(A) is a front elevational view showing enlarged one of the focus detection pixels 222a, while FIG. 5(B) is a front elevational view showing enlarged one of the focus detection pixels 222b;

FIG. 7(A) is a cross-sectional view showing enlarged one of the focus detection pixels 222a, while FIG. 7(B) is a cross-sectional view showing enlarged one of the focus detection pixels 222b;

DESCRIPTION OF THE PREFERRED EMBODIMENTS

Embodiments of the present invention will hereinafter be described with reference to the drawings.

Figure 1:
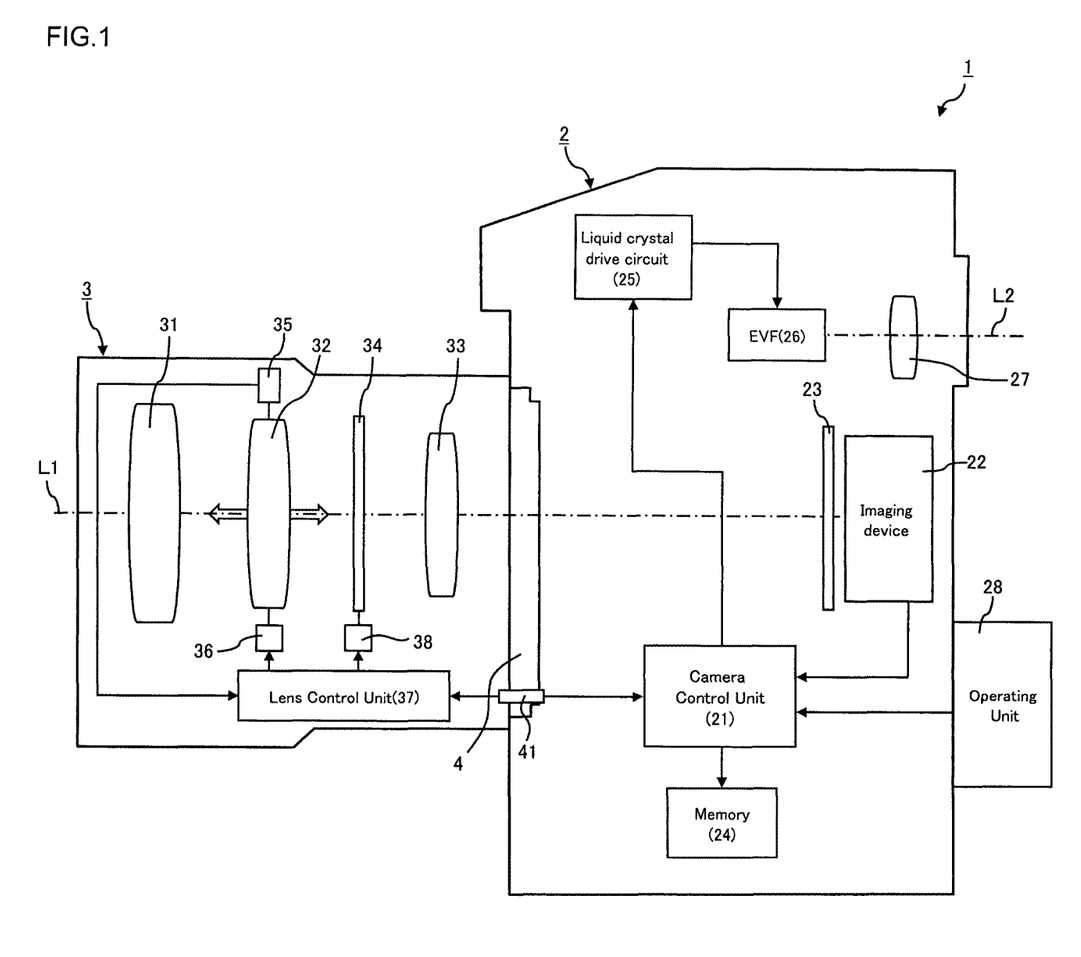
FIG. 1 is a block diagram showing a camera according to an embodiment of the present invention.

FIG. 1 is a view of the principal configuration which shows a digital camera 1 according to an embodiment of the present invention. The digital camera 1 according to the present embodiment (referred simply to as "camera 1", hereinafter) is configured of a camera body 2 and a lens barrel 3, which are connected with each other in a detachable manner using a mount unit 4.

The lens barrel 3 is an interchangeable lens which can be detachably attached to the camera body 2. As shown in FIG. 1, the lens barrel 3 is provided therein with an imaging optical system which includes lenses 31, 32 and 33 and an aperture 34.

The lens 32 is a focus lens, which can be moved in the optical axis L1 direction thereby to allow the focal distance of the imaging optical system to be adjusted. The focus lens 32 is provided so as to be movable along the optical axis L1 of the lens barrel 3, and the position of the focus lens 32 may be adjusted by a focus lens drive motor 36 while being detected by an encoder 35.

The specific configuration of the movement mechanism for the focus lens 32 along the optical axis L1 is not particularly limited. As one example, a rotating barrel is inserted in a rotatable manner inside a fixed barrel fixed to the lens barrel 3. The inner circumferential surface of this rotating barrel is formed with a helicoid groove (spiral groove). The end of a lens frame to which the focus lens 32 is fixed is engaged with the helicoid groove. The focus lens drive motor 36 is used to rotate the rotating barrel, so that the focus lens 32 fixed to the lens frame moves straight along the optical axis L1.

As described above, by rotating the rotating barrel with respect to the lens barrel 3, the focus lens 32 fixed to the lens frame moves straight in the optical axis L1 direction. The focus lens drive motor 36 as a drive source for the above movement is provided in the lens barrel 3. The focus lens drive motor 36 and the rotating barrel are, for example, coupled via a transmission comprising a plurality of gears. If the drive shaft of the focus lens drive motor 36 is driven to rotate to either direction, then this driving force will be transmitted to the rotating barrel by a predetermined gear ratio to drive it in either direction, thereby moving the focus lens 32 fixed to the lens frame straight in a certain direction along the optical axis L1. If, on the other hand, the drive shaft of the focus lens drive motor 36 is driven to rotate in the opposite direction, then the gears of the transmission also rotate in the opposite directions, and the focus lens 32 will move straight in the opposite direction along the optical axis L1.

The position of the focus lens 32 is detected by the encoder 35. As already described, the position in the optical axis L1 direction of the focus lens 32 is correlated with the rotational angle of the rotating barrel, and can thus be determined by detecting the relative rotational angle of the rotating barrel with respect to the lens barrel 3, for example.

As the encoder 35 in the present embodiment, it is possible to use one which detects rotation of a rotary disk coupled with the rotational drive of the rotating barrel by a photo sensor such as a photo interrupter so as to output a pulse signal corresponding to the rotational speed, or one which brings an encoder pattern on the surface of a flexible printed circuit board provided at either one of the fixed barrel and the rotating barrel into contact with a brush contact which is provided at the other and detects the change in the contact position corresponding to the amount of movement of the rotating barrel (either in the rotational direction or optical axis direction) by a detection circuit, etc.

The focus lens 32 can be moved by rotation of the above-described rotating barrel from the end at the camera body side (referred also to as "near end") to the end at the object side (referred also to as "infinite end") in the optical axis L1 direction. Information on the current position of the focus lens 32 detected by the encoder 35 is sent through the lens control unit 37 to a camera control unit 21 as will be described later. This information is used as the basis to calculate a drive position of the focus lens 32, which is sent from the camera control unit 21 through the lens control unit 37 thereby to drive the focus lens drive motor 36.

The aperture 34 is configured such that the aperture size centered on the optical axis L1 can be adjusted in order to restrict the amount of light beams which pass through the above imaging optical system and reach an imaging device 22 and to adjust the amount of blurring. The size of the aperture 34 is adjusted by a suitable aperture size, which was calculated in the automatic exposure mode, being sent from the camera control unit 21 through the lens control unit 37 to an aperture drive unit 38, for example. This adjustment may also be performed by an aperture size, which was set in the manual operation using the operating unit 28 provided at the camera body 2, being input from the camera control unit 21 through the lens control unit 37 to the aperture drive unit 38. The aperture size of the aperture 34 is detected by an aperture sensor not shown, and the lens control unit 37 recognizes the current aperture size. According to the present embodiment, to prevent the driving noise due to the aperture 34 from being recorded during the motion picture imaging, the lens control unit 37 controls the drive of the aperture 34 by the aperture drive unit 38 so that the aperture 34 is driven at a lower speed during the motion picture imaging than that in the still picture imaging.

On the other hand, in the camera body 2, the imaging device 22 which receives light beams L1 from the above imaging optical system is provided at a predetermined focal plane of the imaging optical system. At the front of the same, a shutter 23 is provided. The imaging device 22 is configured of a device, such as CCD and CMOS, which converts the received optical signal to an electrical signal to send it to the camera control unit 21. Captured image information sent to the camera control unit 21 is sequentially sent to a liquid crystal drive circuit 25 and is displayed on an electronic viewfinder (EVF) 26 of a viewing optical system. When a release button (not shown) provided at the operating unit 28 is fully pressed, the captured image information is recorded in the recording medium, that is, a memory 24. The memory 24 can be any of a detachable card type memory or built-in type memory. In front of the imaging plane of the imaging device 22, an infrared cut filter for cutting the infrared light and an optical low pass filter for preventing the aliasing noise of images are arranged. Details of the structure of the imaging device 22 will be described later.

The viewing optical system is provided in the camera body 2, for viewing the image captured by the imaging device 22. The viewing optical system in the present embodiment comprises: the electronic viewfinder (EVF) 26 comprising a liquid crystal display element; the liquid crystal drive circuit 25 which drives the electronic viewfinder 26; and an ocular lens 27. The liquid crystal drive circuit 25 reads captured image information which was captured by the imaging device 22 and was sent to the camera control unit 21, and uses this as the basis to drive the electronic viewfinder 26. This allows the user to view the currently captured image through the ocular lens 27. Instead of the above viewing optical system using the optical axis L2 or in addition to it, it is also possible to provide a liquid crystal display at the back surface of the camera body 2 etc. and display the captured image on this liquid crystal display.

The camera control unit 21 is provided in the camera body 2. The camera control unit 21, which is electrically connected with the lens control unit 37 via an electrical signal contact unit 41 provided on the mount unit 4, receives lens information from the lens control unit 37 and sends information, such as the defocus amount and the aperture size, to the lens control unit 37. The camera control unit 21, as described above, reads the pixel output from the imaging device 22, and processes the read pixel output as necessary by a predetermined information process to generate image information, which is output to the liquid crystal drive circuit 25 of the electronic viewfinder 26 and/or memory 24. In addition, the camera control unit 21 controls the camera 1 as a whole, such as correction of the image information from the imaging device 22 and detection of the state of focus adjustment of the lens barrel 3 and state of aperture adjustment, etc.

Further, the camera control unit 21, in addition to the above, uses the pixel data read from the imaging device 22 as the basis for detection of a focal state of the imaging optical system by a phase detection system and detection of a focal state of the imaging optical system by a contrast detection system. The specific method of detection of the focal state will be described later.

The operating unit 28 includes the shutter release button, a motion picture imaging button and further input switches for the user to set various operating modes of the camera 1, and is designed to enable switching of the auto focus mode/manual focus mode. The operating unit 28 is also designed to enable switching of the still picture imaging mode/motion picture imaging mode. When the motion picture imaging mode is selected, pressing the motion picture imaging button by a photographer enables motion pictures to be captured. The various modes set via the operating unit 28 are sent to the camera control unit 21, which controls the operation of the camera 1 as a whole. The shutter release button includes a first switch SW1 which is turned on by half pressing of the button and a second switch SW2 which is turned on by full pressing of the button.

The imaging device 22 according to the present embodiment will now be explained.

Figure 2:
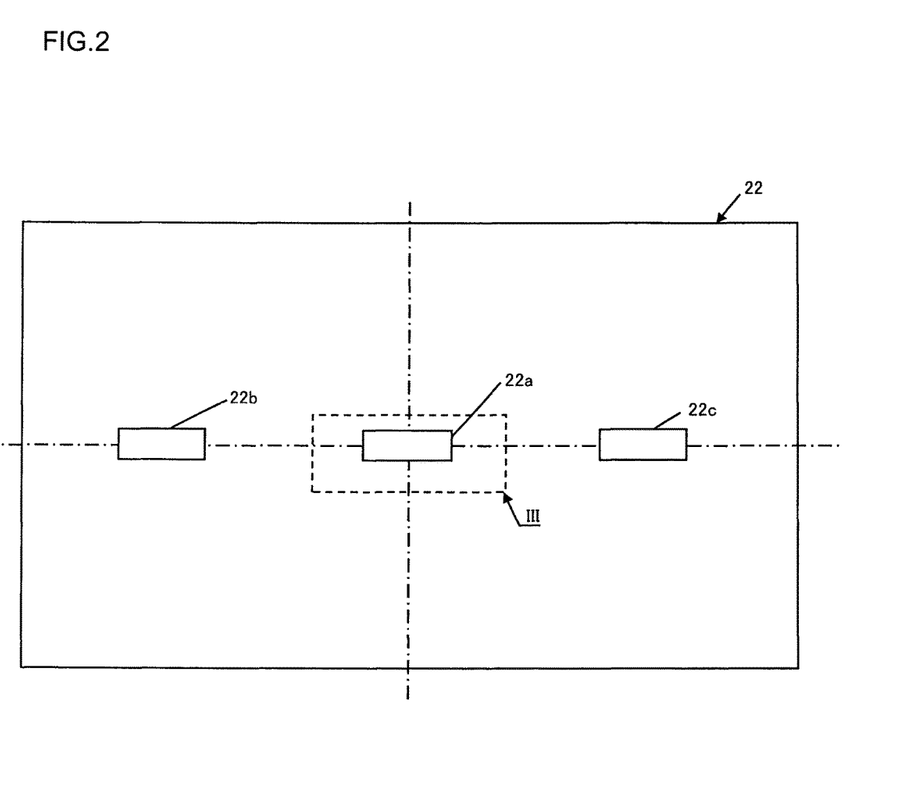
FIG. 2 is a front view showing an imaging plane of an imaging device shown in FIG. 1.
Figure 3:
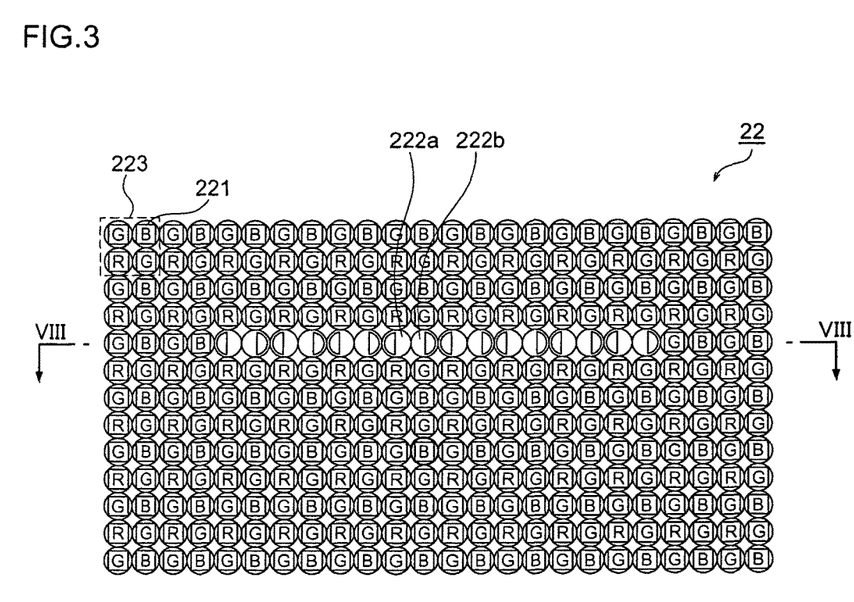
FIG. 3 is a front elevational view which enlarges part III of FIG. 2 to schematically show an arrangement of focus detection pixels 222a and 222b.

FIG. 2 is a front elevational view which shows an imaging plane of the imaging device 22, and FIG. 3 is a front elevational view which enlarges part III of FIG. 2 to schematically show the arrangement of focus detection pixels 222a and 222b.

The imaging device 22 of the present embodiment, as shown in FIG. 3, is configured such that a plurality of imaging pixels 221 are arranged two-dimensionally on the plane of the imaging plane, i.e., green pixels G having color filters which pass the wavelength region of the green color, red pixels R having color filters which pass the wavelength region of the red color, and blue pixels B having color filters which pass the wavelength region of the blue color, are arranged on a so-called "Bayer arrangement". That is, in each group 223 of four adjoining pixels (closely packed square lattice array), two green pixels are arranged on one diagonal, while one red pixel and one blue pixel are arranged on the other diagonal. By using such groups 223 of pixels arranged in a Bayer arrangement as units and arranging such groups 223 of pixels on the imaging plane of the imaging device 22 repeatedly two-dimensionally, the imaging device 22 is configured.

The array in the unit pixel group 223 may also be a closely packed hexagonal lattice array instead of the illustrated closely packed square lattice, for example. The configuration and array of the color filters are not limited to the above. It is also possible to employ an array of complementary color filters (green: G, yellow: Ye, magenta: Mg, and cyan: Cy).

Figure 4:
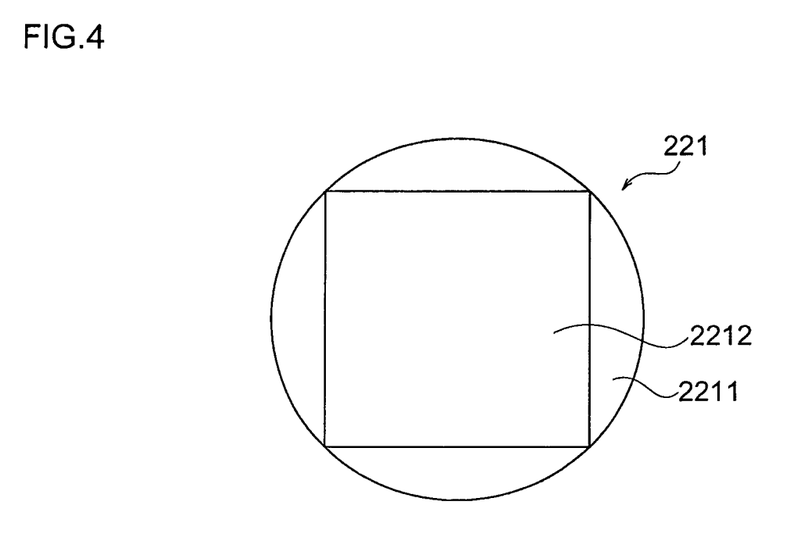
FIG. 4 is a front elevational view showing enlarged one of the imaging pixels 221.
Figure 6:
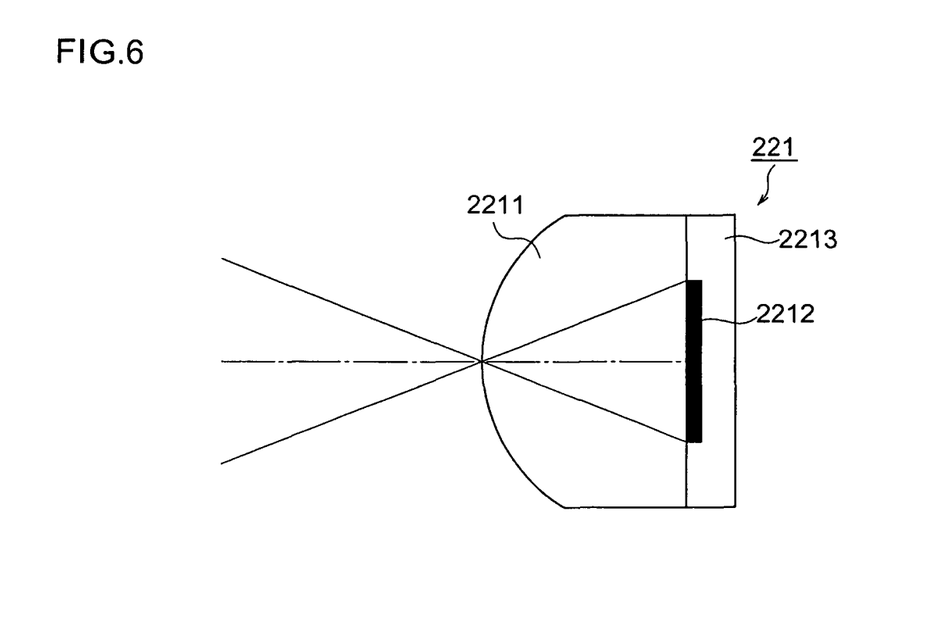
FIG. 6 is a cross-sectional view showing enlarged one of the imaging pixels 221.

FIG. 4 is a front elevational view which shows one of the imaging pixels 221 enlarged, while FIG. 6 is a cross-sectional view of the same. One imaging pixel 221 is configured of a microlens 2211, a photoelectric conversion unit 2212, and a not shown color filter. As shown in the cross-sectional view of FIG. 6, the photoelectric conversion unit 2212 is built into the surface of a semiconductor circuit board 2213 of the imaging device 22, while the microlens 2211 is formed on the surface of that. The photoelectric conversion unit 2212 is shaped to use the microlens 2211 to receive the imaging light beams passing through an exit pupil (for example, F1.0) of the imaging optical system, and thereby receives the imaging light beams.

In addition, at the center of the imaging plane of the imaging device 22 and at the left and right symmetric positions from the center, that is, at three locations, focus detection pixel strings 22a, 22b and 22c are provided, at each of which focus detection pixels 222a and 222b are arranged as substitute for the above-described imaging pixels 221. As shown in FIG. 3, one focus detection pixel string is configured such that a plurality of focus detection pixels 222a and 222b are arranged adjoining each other alternately in a horizontal string (22a, 22b, 22c). In the present embodiment, the focus detection pixels 222a and 222b are densely arranged without gap at the positions of the green pixels G and blue pixels B of the imaging pixels 221 arranged in a Bayer arrangement.

The positions of the focus detection pixel strings 22a to 22c shown in FIG. 2 are not limited to the illustrated positions. Strings may be arranged at any single location or two locations, or four or more locations. Further, during actual focus detection, the photographer can also manually operate the operating unit 28 to select a desired focus detection pixel string as the focus detection area from among the plurality of arranged focus detection pixel strings 22a to 22c.

Figure 5:
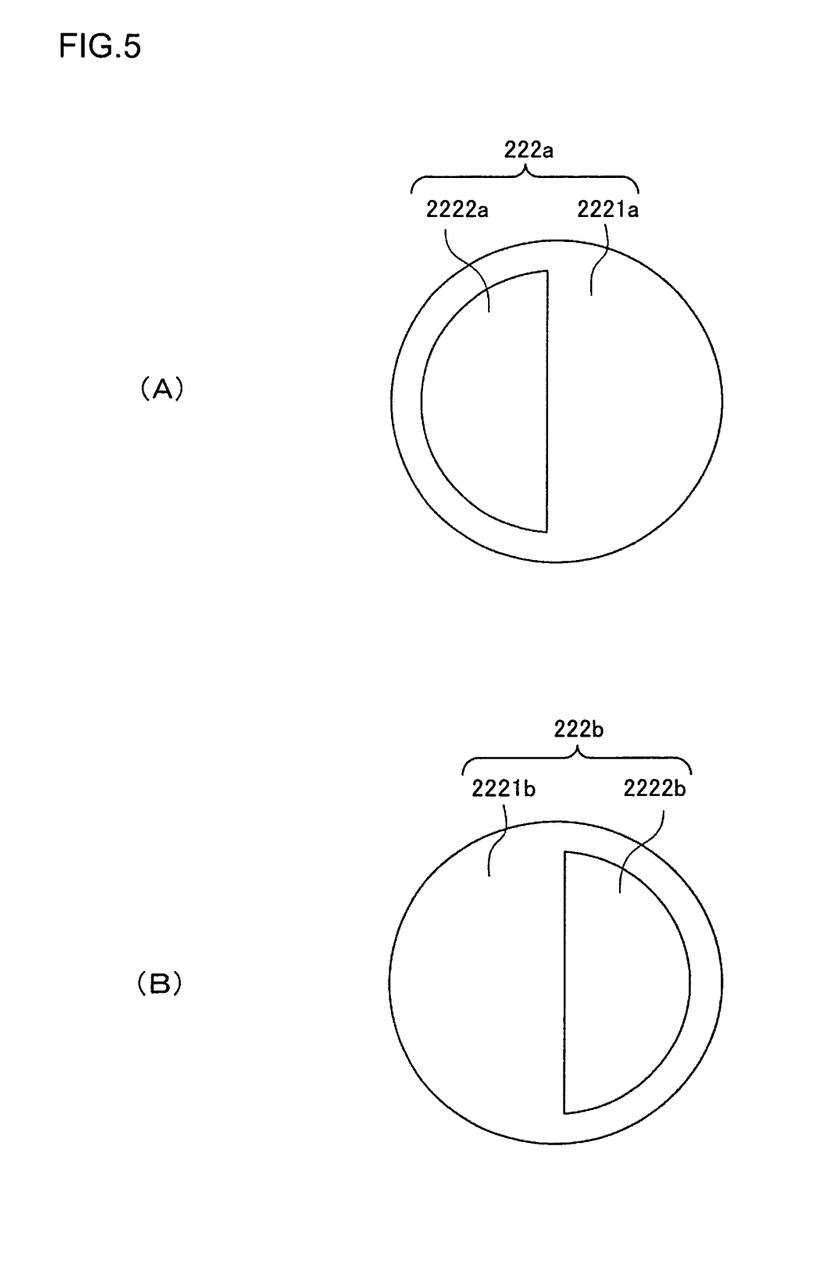
Figure 7:
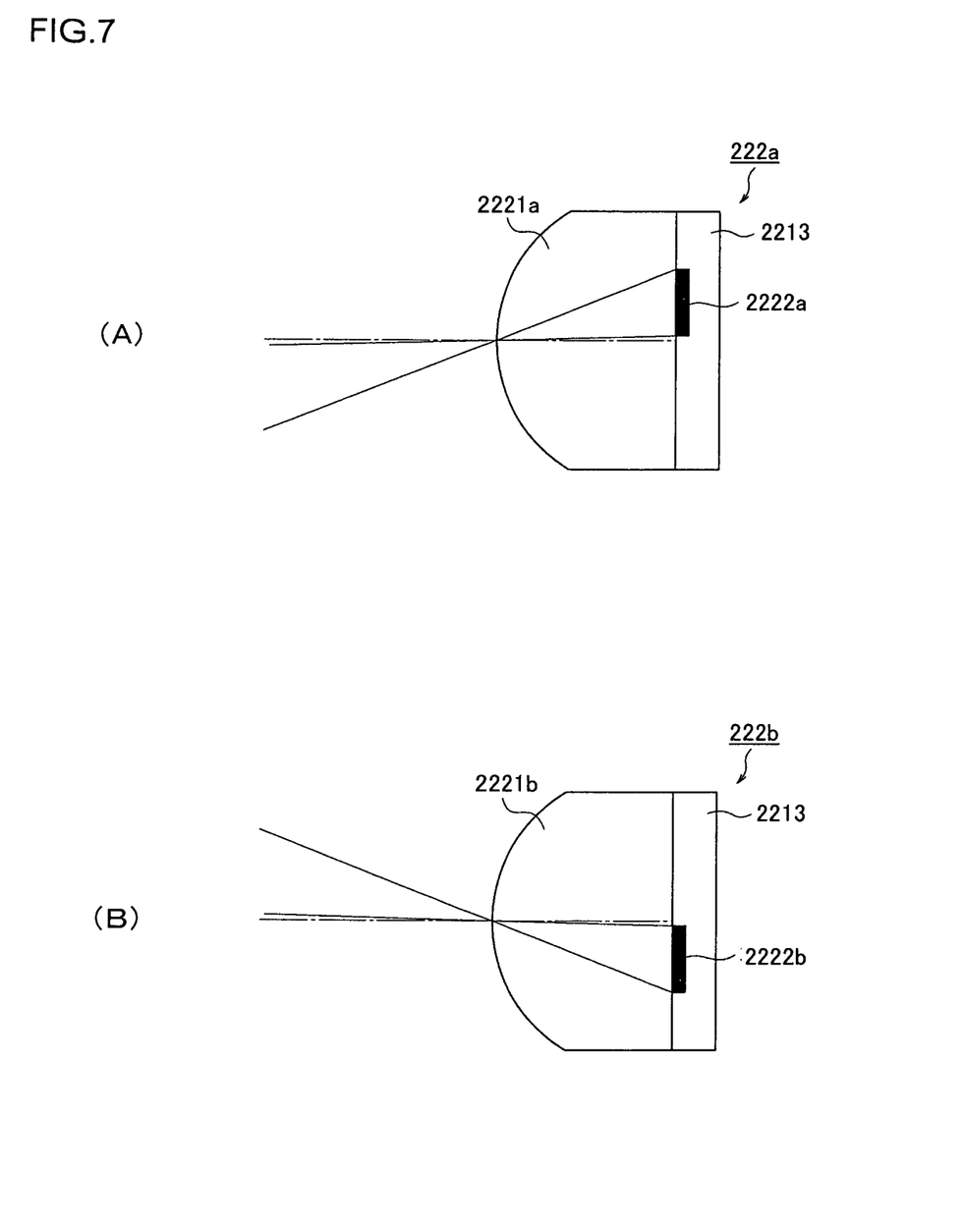

FIG. 5(A) is a front elevational view which shows one of the focus detection pixels 222a enlarged, while FIG. 7(A) is a cross-sectional view of the focus detection pixel 222a. FIG. 5(B) is a front elevational view which shows one of the focus detection pixels 222b enlarged, while FIG. 7(B) is a cross-sectional view of the focus detection pixel 222b. The focus detection pixel 222a, as shown in FIG. 5(A), is configured of a microlens 2221a and a semicircular shaped photoelectric conversion unit 2222a. As shown in the cross-sectional view of FIG. 7(A), the photoelectric conversion unit 2222a is built into the surface of a semiconductor circuit board 2213 of the imaging device 22, while the microlens 2221a is formed on the surface of that. The focus detection pixel 222b, as shown in FIG. 5(B), is configured of a microlens 2221b and a photoelectric conversion unit 2222b. As shown in the cross-sectional view of FIG. 7(B), the photoelectric conversion unit 2222b is built into the surface of a semiconductor circuit board 2213 of the imaging device 22, while the microlens 2221b is formed on the surface of that. These focus detection pixels 222a and 222b, as shown in FIG. 3, are arranged mutually adjoining each other in a horizontal string to thereby form the focus detection pixel strings 22a to 22c shown in FIG. 2.

The photoelectric conversion units 2222a and 2222b of the focus detection pixels 222a and 222b are shaped to use the microlenses 2221a and 2221b to receive the light beams passing through a predetermined region (for example, F2.8) of the exit pupil of the imaging optical system. The focus detection pixels 222a and 222b are not provided with color filters, so that their spectral characteristics are combinations of the spectral characteristics of the photodiodes which perform the photoelectric conversion and the spectral characteristics of infrared cut filters not shown. Note, however, that each pixel may also be configured to comprise one of the same color filters as those of the imaging pixels 221, for example, the green filter.

The photoelectric conversion units 2222a and 2222b of the focus detection pixels 222a and 222b shown in FIG. 5(A) and FIG. 5(B) are made semicircular shapes, but the shapes of the photoelectric conversion units 2222a and 2222*b* are not limited to this. Other shapes, for example, oval shapes, rectangular shapes and polygonal shapes can also be used.

The description will now be directed to the so-called "phase difference detection system" which detects the focal state of the imaging optical system on the basis of the pixel outputs of the above-described focus detection pixels 222*a* and 222*b*.

Figure 8:
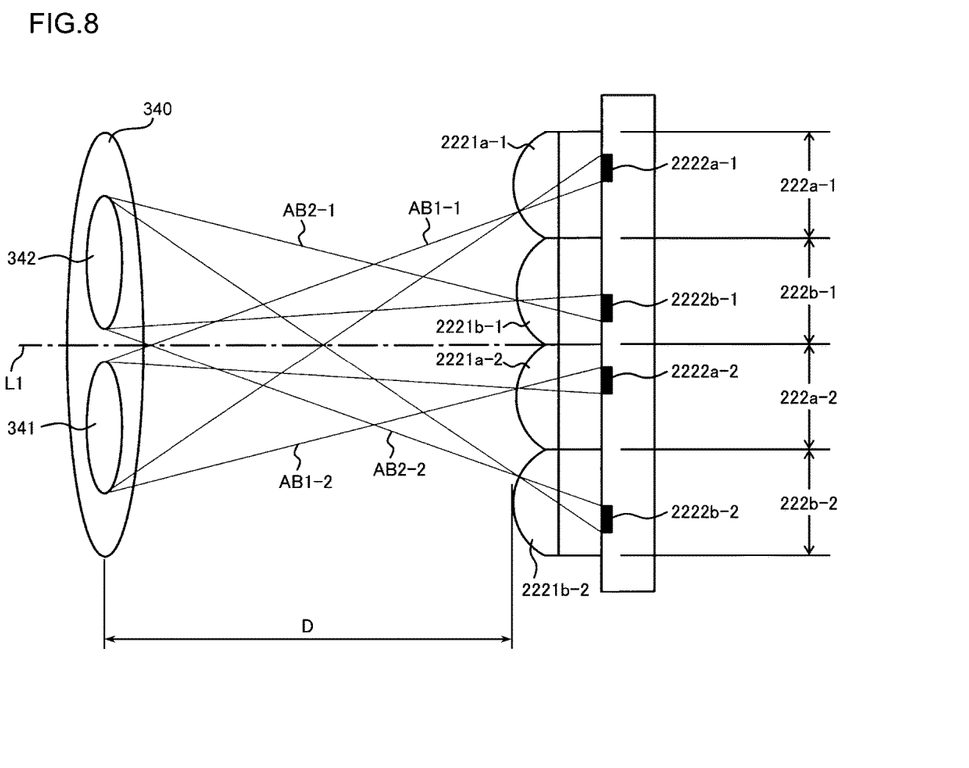
FIG. 8 is a cross-sectional view along line VIII-VIII of FIG. 3.

FIG. 8 is a cross-sectional view along line VIII-VIII of FIG. 3, and shows that the focus detection pixels 222*a*-1, 222*b*-1, 222*a*-2 and 222*b*-2 arranged near the imaging optical axis L1 and adjoining one another receive the light beams AB1-1, AB2-1, AB1-2 and AB2-2, respectively, which are emitted from the distance measuring pupils 341 and 342 of the exit pupil 340. In FIG. 8, among the plurality of focus detection pixels 222*a* and 222*b*, only those positioned near the imaging optical axis L are shown as examples, but the other focus detection pixels other than those shown in FIG. 8 are similarly configured to receive respective light beams emitted from the pair of distance measuring pupils 341 and 342.

The "exit pupil 340" as used herein is an image which is set at the position of the distance D in front of the microlenses 2221*a* and 2221*b* of the focus detection pixels 222*a* and 222*b* arranged at the predetermined focus plane of the imaging optical system. The distance D is the value unambiguously determined in accordance with the curvature and the refractive index of the microlens and the distance between the microlens and the photoelectric conversion unit, etc. This distance D is referred to as the "distance measuring pupil distance". The "distance measuring pupils 341 and 342" as used herein are images of the photoelectric conversion units 2222*a* and 2222*b* which are projected respectively by the microlenses 2221*a* and 2221*b* of the focus detection pixels 222*a* and 222*b*.

In FIG. 8, the direction of arrangement of the focus detection pixels 222*a*-1, 222*b*-1, 222*a*-2 and 222*b*-2 matches the direction of arrangement of the pair of distance measuring pupils 341 and 342.

As shown in FIG. 8, the microlenses 2221*a*-1, 2221*b*-1, 2221*a*-2 and 2221*b*-2 of the focus detection pixels 222*a*-1, 222*b*-1, 222*a*-2 and 222*b*-2 are arranged near the predetermined focal plane of the imaging optical system. When the shapes of the photoelectric conversion units 2222*a*-1, 2222*b*-1, 2222*a*-2 and 2222*b*-2 arranged behind the microlenses 2221*a*-1, 2221*b*-1, 2221*a*-2 and 2221*b*-2 are projected on the exit pupil 34 which is separated from the microlenses 2221*a*-1, 2221*b*-1, 2221*a*-2 and 2221*b*-2 by exactly the distance measurement distance D, the projected shapes form the distance measuring pupils 341 and 342.

In other words, the relative positional relationships of the microlenses and the photoelectric conversion units in the focus detection pixels are set so that the projected shapes (distance measuring pupils 341 and 342) of the photoelectric conversion units of the focus detection pixels match on the exit pupil 340 at the distance measurement distance D, and the directions of projection of the photoelectric conversion units in the focus detection pixels are thus determined.

As shown in FIG. 8, the photoelectric conversion unit 2222*a*-1 of the focus detection pixel 222*a*-1 outputs a signal corresponding to the intensity of an image formed on the microlens 2221*a*-1 by the light beam AB1-1 which passes through the distance measuring pupil 341 and heads toward the microlens 2221*a*-1. Similarly, the photoelectric conversion unit 2222*a*-2 of the focus detection pixel 222*a*-2 outputs a signal corresponding to the intensity of an image formed on the microlens 2221*a*-2 by the light beam AB1-2 which passes through the distance measuring pupil 341 and heads toward the microlens 2221*a*-2.

The photoelectric conversion unit 2222*b*-1 of the focus detection pixel 222*b*-1 outputs a signal corresponding to the intensity of an image formed on the microlens 2221*b*-1 by the light beam AB2-1 which passes through the distance measuring pupil 342 and heads toward the microlens 2221*b*-1. Similarly, the photoelectric conversion unit 2222*b*-2 of the focus detection pixel 222*b*-2 outputs a signal corresponding to the intensity of an image formed on the microlens 2221*b*-2 by the light beam AB2-2 which passes through the distance measuring pupil 342 and heads toward the microlens 2221*b*-2.

By arranging the above-described two types of plural focus detection pixels 222*a* and 222*b* in a straight line as shown in FIG. 3 and grouping the outputs of the photoelectric conversion units 2222*a* and 2222*b* of the focus detection pixels 222*a* and 222*b* into respective output groups corresponding to the distance measuring pupils 341 and 342, data is obtained relating to the intensity distributions of the pair of images which the focus detection beams passing through the distance measuring pupils 341 and 342 form on the focus detection pixel strings. This intensity distribution data can be processed by image deviation detection operation, such as correlation operation or phase difference detection, thereby to detect an image deviation amount by the so-called phase difference detection system.

Further, by processing the obtained image deviation amount using conversion operation depending on the interval between the centers of gravity of the pair of distance measuring pupils, it is possible to find the deviation of the current focal plane with respect to the predetermined focal plane (focal plane at focus detection area corresponding to position of microlens array on predetermined focal plane), that is, the defocus amount.

The calculation of the image deviation amount using the phase difference detection system and the calculation of the defocus amount based thereon are performed by the camera control unit 21.

Figure 9:
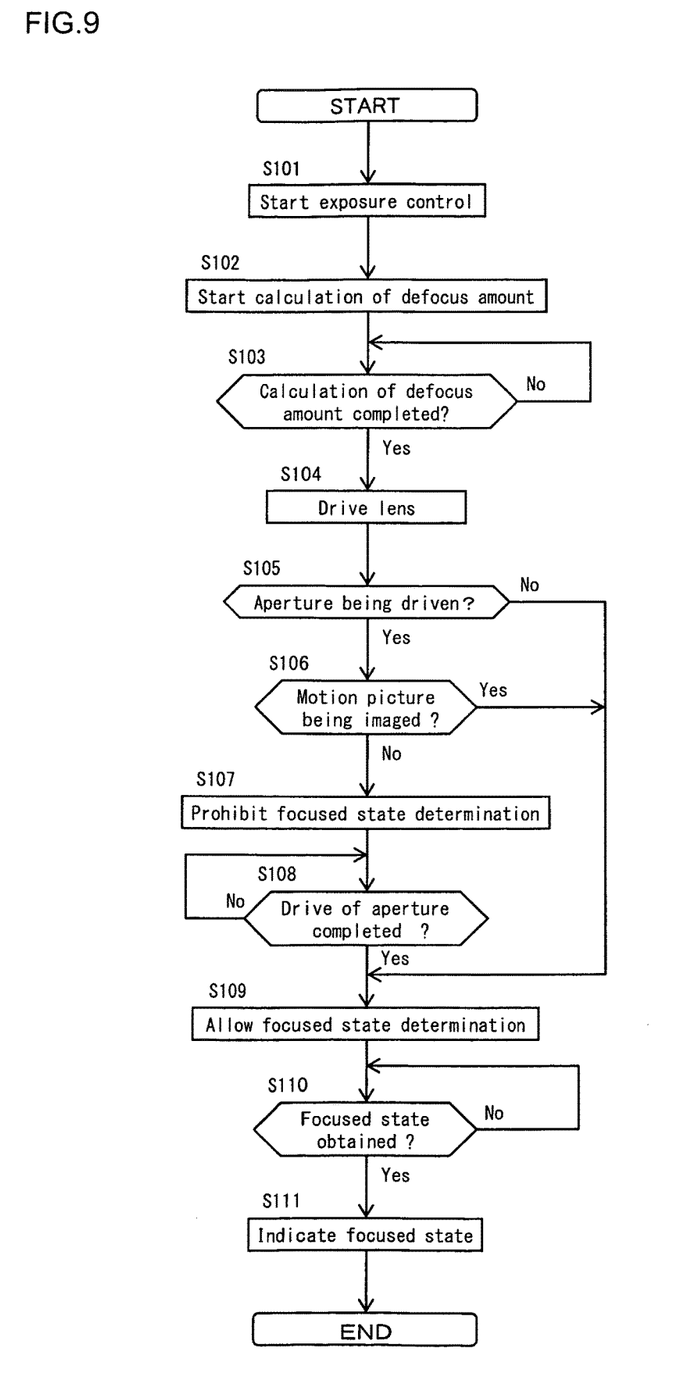
FIG. 9 is a flow chart showing an example of operation of the camera according to the present embodiment.

An example of the operation of the camera 1 according to the present embodiment will then be described with reference to FIG. 9. FIG. 9 is a flowchart showing an example of the operation of the camera 1 according to the present embodiment.

First at step S101, the camera control unit 21 starts an exposure control. Specifically, the camera control unit 21 calculates a brightness value Bv of the imaging picture plane at a whole using multi-pattern photometry, for example, and uses the calculated brightness value Bv as the basis to determine an aperture Av, an imaging sensitivity Sv and an exposure time Tv for an appropriate exposure, which are used as the basis to control the aperture 34 and/or the imaging device 22 thereby allowing the exposure to be controlled for the imaging device 22. For example, on the basis of the determined aperture Av based on the photometry result, the camera control unit 21 drives the aperture 34 using the aperture drive unit 38 to adjust the aperture size of the aperture 34 thereby allowing the exposure to be controlled for the imaging device 22. Such an exposure control may be performed repeatedly at a predetermined interval.

Then at step S102, the camera control unit 21 starts the processing for calculation of the defocus amount by the phase difference detection system. In the present embodiment, the processing for calculation of the defocus amount by the phase difference detection system is performed as follows: That is, first, the camera control unit 21 reads a pair of image data corresponding to each pair of images from the focus detection pixels 222a and 222b which constitute each of the three focus detection pixel strings 22a to 22c of the imaging device 22. The camera control unit 21 uses the read pair of image data as the basis to perform the processing for detection of image deviation (correlation processing).

Specifically, the camera control unit 21 performs correlation calculation as represented by the Equation (1) below while shifting relatively in one dimension a first image data string $a_1, a_2, \ldots, a_n$ and a second image data string $b_1, b_2, \ldots, b_n$ read from each of the focus detection pixel strings 22a, 22b and 22c.

$$C(k)=\Sigma|a(n+k)-b(n)| \tag{1}$$

In the above Equation (1), the $\Sigma$ operation refers to accumulation operation (summation operation) with respect to "n", which is limited within a range in which data of $a(n+k)$ and $b(n)$ exists in accordance with an image deviating amount "k". The image deviating amount "k", which is an integer, refers to a shift amount in terms of the pixel interval of the focus detection pixel strings 22a to 22c. As a person skilled in the art would appreciate, in the operation result from the above Equation (1), the correlation amount $C(k)$ is the local minimum at a shift amount which gives a high correlation between the pair of image data (a smaller correlation amount provides a higher degree of correlation).

The camera control unit 21 then calculates the local minimum value of the correlation amount on the basis of the calculated correlation amounts $C(k)$. According to the present embodiment, a three-point interpolation method as represented by the Equations (2) to (5) below, for example, can be used to calculate a local minimum value $C(x)$ for the continuous correlation amount and a shift amount x that gives the local minimum value $C(x)$. In the equations below, $C(kj)$ is a value that satisfies the condition of $C(k-1) \geq C(k)$ and $C(k+1) > C(k)$ among the obtained correlation amounts $C(k)$ from the above Equation (1).

$$D=\{C(kj-1)-C(kj+1)\}/2 \tag{2}$$

$$C(x)=C(kj)-|D| \tag{3}$$

$$x=kj+D/SLOP \tag{4}$$

$$SLOP=\text{MAX}\{C(kj+1)-C(kj), C(kj-1)-C(kj)\} \tag{5}$$

The camera control unit 21 calculates a defocus amount df on the basis of the shift amount x at which the local minimum value $C(x)$ of the correlation amount is obtained, in accordance with the Equation (6) below:

$$df=x \cdot k \tag{6}$$

In the above Equation (6), "k" is a conversion coefficient (k factor) for converting the shift amount x at which the local minimum value $C(x)$ of the correlation amount is obtained to a defocus amount. The conversion coefficient k, which is determined depending on the aperture value, takes a larger value as the aperture value increases. This is because the change in the aperture size of the aperture causes the focal state of the optical system also to change so that if the defocus amount (the deviation amount of the current focal plane with respect to the predetermined focal plane) is the same, then a larger aperture value (a smaller aperture size of the aperture 34) provides a smaller shift amount x at which the local minimum value $C(x)$ of the correlation amount is obtained.

In addition to calculating the defocus amount in such a way, the camera control unit 21 performs evaluation of the reliability of the calculated defocus amount. Evaluation of the reliability of the defocus amount can be performed on the basis of appropriate parameters, such as contrast and a degree of matching of the pair of image data.

Such calculation of the defocus amount by the phase difference detection system and evaluation of the reliability of the defocus amount may be executed repeatedly at a predetermined interval.

At step S103, determination is made whether or not the camera control unit 21 was able to calculate the defocus amount. If the defocus amount was able to be calculated, then measurement of distance is determined to be possible and the process proceeds to step S104. If, on the other hand, the defocus amount was not able be calculated, then measurement of distance is determined not to be possible and the process stands by at step S103 until the defocus amount is able to be calculated. That is, according to the present embodiment, the exposure control and the calculation of the defocus amount are to be performed repeatedly until the defocus amount is able to be calculated. In addition, according to the present embodiment, even if the defocus amount was able to be calculated, cases where the calculated defocus amount has low reliability are treated such that the defocus amount was not able to be calculated, and the process stands by at step S103. According to the present embodiment, the reliability of the defocus amount is determined to be low if the contrast of the object is low, the object is a very low brightness object, or the object is a very high brightness object, for example.

At step S104, the defocus amount has been determined to be calculated, and the camera control unit 21 therefore uses the calculated defocus amount as the basis to calculate a lens drive amount that is necessary to drive the focus lens 32 to the focused position. The calculated lens drive amount is sent to the focus lens drive motor 36 via the lens control unit 37. This allows the focus lens drive motor 36 to start the drive of the focus lens 32 on the basis of the calculated lens drive amount. According to the present embodiment, even after the drive of the focus lens 32 is started, the calculation of the defocus amount is performed repeatedly at a predetermined interval, so that if a defocus amount is newly calculated, then the focus lens 32 is driven on the basis of the newly calculated defocus amount.

Next at step S105, the camera control unit 21 determines whether the drive of the aperture 34 is being performed or not. According to the present embodiment, the exposure control is performed repeatedly at a predetermined interval, and if the aperture Av is changed in such an exposure control, then the changed aperture Av is sent from the camera control unit 21 via the lens control unit 37 to the aperture drive unit 38, which is to use the aperture Av as the basis to perform the drive of the aperture 34. In such a manner, determination is made at step S105 whether the drive of the aperture 34 is being performed or not, and if the aperture 34 is determined as being driven, then the process proceeds to step S106, while on the other hand if the aperture 34 is determined as not being driven, then the process proceeds to step S109. As will be appreciated by a person skilled in the art, when a certain mode is selected, such as an exposure control mode where the imaging sensitivity Sv is fixed to perform imaging, the exposure control may often be performed by adjusting the aperture Av, and it is thus likely to be determined that the drive of the aperture 34 is being performed.

Thus, if the drive of the aperture 34 has been determined as being performed in step S105, then the process proceeds to step S106, at which the camera control unit 21 determines whether the motion picture imaging is performed or not. For example, provided that the motion picture imaging mode is selected, if the motion picture imaging button is pressed by the photographer, then the camera control unit 21 determines that the motion picture imaging has been started, and the process proceeds to step S109. If, on the other hand, the still picture imaging mode is selected, then the camera control unit 21 determines that the still picture imaging is performed and the motion picture imaging is not performed, and the process proceeds to step S107.

If the drive of the aperture 34 has been determined as being performed in step S105 and the still picture imaging has been determined as being performed in step S106, then the process proceeds to step S107, at which the camera control unit 21 performs a focused state determination prohibiting process that prohibits the focused state determination. The focused state determination will be described later.

At step S108, the camera control unit 21 determines whether the drive of the aperture 34 has been completed or not. If the drive of the aperture 34 has been determined to be completed, then the process proceeds to step S109. If, on the other hand, the drive of the aperture 34 has been determined not to be completed, then the process stands by at step S108. That is, according to the present embodiment, if the aperture 34 is being driven during the still picture imaging, then the focused state determination is prohibited and step S108 is repeated until the drive of the aperture 34 is completed. When the drive of the aperture 34 is completed, the process will proceed to step S109.

If the drive of the aperture 34 has been determined to be completed at step S108, then the process proceeds to step S109, at which the camera control unit 21 performs a focused state determination allowing process that allows the focused state determination. In addition, if the drive of the aperture 34 has been determined as not being performed at step S105, or if the motion picture imaging has been determined as being performed at step S106, then the process also proceeds to step S109 and the camera control unit 21 performs the focused state determination allowing process that allows the focused state determination.

At step S110, the camera control unit 21 performs the focused state determination because this determination is allowed. Specifically, the camera control unit 21 determines whether the absolute value of the calculated defocus amount is not more than a predetermined value, and if so, determines that the focal state of the optical system is a focused state, proceeding to step S111 to perform indication of the focused state. If, on the other hand, the absolute value of the calculated defocus amount is more than the predetermined value, then the camera control unit 21 determines that the focal state of the optical system is not a focused state, and performs repeatedly the focused state determination of step S110. That is, according to the present embodiment, even while the drive of the focus lens 32 is being performed, the calculation of the defocus amount is performed repeatedly so that the focused state determination is also performed repeatedly until the absolute value of the newly calculated defocus amount becomes the predetermined value or less, and if the absolute value of the newly calculated defocus amount becomes the predetermined value or less, then the indication of the focused state will be performed. The indication of the focused state at step S111 may be performed by the electronic viewfinder 26, for example.

The camera 1 according to the present embodiment operates as heretofore described.

In such a manner, according to the present embodiment, if the drive of the aperture 34 is being performed and the still picture imaging is performed, then the focused state determination is prohibited, but even if the drive of the aperture 34 is being performed, the focused state determination is allowed to be performed if the motion picture imaging is performed. This results in the advantageous effect below according to the present embodiment. When the aperture 34 is being driven, the change in the aperture size of the aperture 34 also changes the focal state of the optical system, so that the conversion efficient (k factor) determined in accordance with the aperture value may not be used to appropriately calculate the defocus amount, which can thus not be used as the basis to appropriately perform the focused state determination. For this reason, the focused state determination is prohibited until the drive of the aperture 34 is completed and performed after the drive of the aperture 34 is completed, and the defocus amount can thereby be appropriately calculated to be used as the basis to appropriately perform the focused state determination. However, provided that the motion picture imaging is performed, if the focused state determination is prohibited until the drive of the aperture 34 is completed, then the focal state is determined to be a non-focused state for a long time until the drive of the aperture 34 is stopped, such as when the aperture 34 is driven at a lower speed during the motion picture imaging than that in the still picture imaging so that the driving noise due to the aperture 34 is not recorded. This is problematic because the motion picture cannot be appropriately imaged such as due to the focus lens 32 remaining in being driven until the focused state is obtained. In contrast, according to the present embodiment, upon the motion picture imaging, the focused state determination is allowed even while the drive of the aperture 34 is being performed. The present embodiment can thus have an advantageous effect that the problem as the above can be effectively solved.

It should be appreciated that the embodiments heretofore explained are described to facilitate understanding of the present invention and are not described to limit the present invention. Therefore, it is intended that the elements disclosed in the above embodiments include all design changes and equivalents to fall within the technical scope of the present invention.

For example, the above-described embodiment has been described to have a configuration such that, when performing the exposure control, a brightness value Bv of the imaging picture plane at a whole is calculated using multipattern photometry, and the exposure control is performed on the basis of the calculated brightness value Bv, but in an alternative embodiment, another configuration may also be possible, for example, such that spot photometry is performed within a predetermined region which includes the focus detection area, thereby to calculate a brightness value Spot_Bv within that region, and the exposure control is performed on the basis of the calculated brightness value Spot_Bv.

Moreover, the above-described embodiment has been described to have a configuration such that the focus detection is performed by a phase difference detection system that calculates a defocus amount using the phase difference and uses the calculated defocus amount as the basis to detect the focal state of the optical system, but the present invention is not limited to using that configuration, and another configuration may also be possible such as using a contrast detection system. For example, the camera control unit 21 may be configured to: read outputs from the imaging pixels 221 of the imaging device 22 at respective lens positions while driving the focus lens 32 with a predetermined sampling interval (distance); extract high-frequency components of the read pixel outputs using a high-frequency pass filter;

accumulate them to obtain a focus evaluation value; and obtain a lens position of the focus lens 32 where the focus evaluation value is maximum, as a focused position. In a further embodiment, a combination may be configured to perform concurrently the focus detection using the phase difference detection system and the focus detection using the contrast detection system.

Furthermore, the above-described embodiment has exemplified a configuration in which the imaging device 22 has the imaging pixels 221 and the focus detection pixels 222a and 222b, and the focus detection by the phase difference detection system is performed using the focus detection pixels 222a and 222b possessed by the imaging device 22, but the present invention is not limited to using that configuration, and another configuration may also be possible in which a focus detection module for performing the focus detection by the phase difference detection system is provided independently from the imaging device 22.

The camera 1 according to the above-described embodiment is not particularly limited. The present invention may for example be applied to a digital video camera, a single lens reflex digital camera, a built-in lens type digital camera, a camera of a mobile phone, or other optical devices.

What is claimed is:

1. A focus adjustment device comprising:
an imaging sensor that captures an image by an optical system which has an aperture and outputs a signal;
a selecting unit that is capable of selecting a motion picture imaging mode and a still picture imaging mode;
a detection unit that detects a focused position of the optical system based on the signal output from the imaging sensor; and
a determination unit that performs a determination to determine whether a position of the optical system is in the focused position where an image through the optical system is focused on the imaging sensor, based on a detection result by the detection unit, wherein
when the still picture imaging mode is selected by the selecting unit, the determination unit does not perform the determination until driving of the aperture is completed, and
when the motion picture imaging mode is selected by the selecting unit, the determination unit performs the determination while the aperture is being driven.

2. The focus adjustment device as recited in claim 1, wherein
when the still picture imaging mode is selected by the selecting unit, the determination unit performs the determination after the driving of the aperture has been completed.

3. The focus adjustment device as recited in claim 1, wherein
the detection unit detects a deviation amount between an image plane by the optical system and an image plane of the imaging sensor based on the signal output from the imaging sensor, and
the determination unit determines that the position of the optical system is not in the focused position when the deviation amount detected by the detection unit is a predetermined amount or more, and determines that the position of the optical system is in the focused position when the deviation amount detected by the detection unit is less than the predetermined amount.

4. The focus adjustment device as recited in claim 1, wherein
the detection unit detects the position of the optical system where the image through the optical system is focused on the imaging sensor, based on an evaluation value of contrast of an image generated from the signal output from the imaging sensor, and
the determination unit determines that the position of the optical system is in the focused position when the evaluation value is a predetermined value or more, and determines that the position of the optical system is not in the focused position when the evaluation value is less than the predetermined value.

5. The focus adjustment device as recited in claim 1, wherein
the aperture is configured to be driven at a first speed or at a second speed slower than the first speed, and
further comprising an aperture control unit that
drives the aperture at the first speed when the still picture imaging mode is selected by the selecting unit, and
drives the aperture at the second speed when the motion picture imaging mode is selected by the selecting unit.

6. An imaging apparatus comprising the focus adjustment device as recited in claim 1.

7. A focus adjustment device comprising:
an imaging sensor that captures an image by an optical system which has an aperture and outputs a signal;
a selecting unit that is capable of selecting a motion picture imaging mode and a still picture imaging mode; and
a detection unit that detects a focused position of the optical system based on the signal output from the imaging sensor, wherein
when the still picture imaging mode is selected by the selecting unit, the detection unit prohibits performance of a detection of the focused position until driving of the aperture is completed, and
when the motion picture imaging mode is selected by the selecting unit, the detection unit allows performance of the detection of the focused position while the aperture is being driven.

8. The focus adjustment device as recited in claim 7, wherein
when the still picture imaging mode is selected by the selecting unit, the detection unit performs the detection of the focused position after the driving of the aperture has been completed.

9. The focus adjustment device as recited in claim 7, wherein
the detection unit detects a deviation amount between an image plane by the optical system and an image plane of the imaging sensor based on the signal output from the imaging sensor.

10. The focus adjustment device as recited in claim 7, wherein
the detection unit detects the position of the optical system where an image through the optical system is focused on the imaging sensor, based on contrast of an image generated from the signal output from the imaging sensor.

11. The focus adjustment device as recited in claim 7, wherein
the aperture is configured to be driven at a first speed or at a second speed slower than the first speed, and
further comprising an aperture control unit that
drives the aperture at the first speed when the still picture imaging mode is selected by the selecting unit, and drives the aperture at the second speed when the motion picture imaging mode is selected by the selecting unit.

12. An imaging apparatus comprising the focus adjustment device as recited in claim 7.

13. A focus adjustment device comprising:
an imaging sensor that captures an image by an optical system which has an aperture and outputs a signal;
a selecting unit that is capable of selecting a motion picture imaging mode and a still picture imaging mode;
a detection unit that detects a focused position of the optical system based on the signal output from the imaging sensor; and
a display unit that performs display which indicates that a position of the optical system is in the focused position where an image through the optical system is focused on the imaging sensor, based on a detection result by the detection unit, wherein
when the still picture imaging mode is selected by the selecting unit, the display unit does not display the display until driving of the aperture is completed, and
when the motion picture imaging mode is selected by the selecting unit, the display unit displays the display while the aperture is being driven.

14. The focus adjustment device as recited in claim 13, wherein
when the still picture imaging mode is selected by the selecting unit, the display unit displays the display after the driving of the aperture has been completed.

15. The focus adjustment device as recited in claim 13, wherein
the detection unit detects a deviation amount between an image plane by the optical system and an image plane of the imaging sensor based on the signal output from the imaging sensor.

16. The focus adjustment device as recited in claim 13, wherein
the detection unit detects the position of the optical system where the image through the optical system is focused on the imaging sensor, based on an evaluation value of contrast of an image generated from the signal output from the imaging sensor.

17. The focus adjustment device as recited in claim 13, wherein
the aperture is configured to be driven at a first speed or at a second speed slower than the first speed, and
further comprising an aperture control unit that
drives the aperture at the first speed when the still picture imaging mode is selected by the selecting unit, and
drives the aperture at the second speed when the motion picture imaging mode is selected by the selecting unit.

* * * * *